(12) United States Patent
Brown et al.

(10) Patent No.: US 9,503,267 B2
(45) Date of Patent: Nov. 22, 2016

(54) GENERATING DIGITAL SIGNATURES

(75) Inventors: Daniel Richard L. Brown, Mississauga (CA); Adrian Antipa, Brampton (CA)

(73) Assignee: Certicom Corp., Mississauga ON (CA)

( * ) Notice: Subject to any disclaimer, the term of this patent is extended or adjusted under 35 U.S.C. 154(b) by 55 days.

(21) Appl. No.: 14/368,737

(22) PCT Filed: Dec. 28, 2011

(86) PCT No.: PCT/CA2011/050810
§ 371 (c)(1),
(2), (4) Date: Jun. 25, 2014

(87) PCT Pub. No.: WO2013/097027
PCT Pub. Date: Jul. 4, 2013

(65) Prior Publication Data
US 2014/0365779 A1    Dec. 11, 2014

(51) Int. Cl.
*H04L 9/32* (2006.01)
*H04L 9/30* (2006.01)
*G06F 21/72* (2013.01)
*G06F 21/10* (2013.01)
*G06F 21/64* (2013.01)

(52) U.S. Cl.
CPC .......... *H04L 9/3252* (2013.01); *H04L 9/3066* (2013.01); *H04L 9/3281* (2013.01); *G06F 21/10* (2013.01); *G06F 21/64* (2013.01); *G06F 21/72* (2013.01)

(58) Field of Classification Search
CPC ......... H04L 9/3281; H04L 9/30; H04L 9/06; H04L 9/08; H04L 9/12; H04L 9/18; H04N 21/64; G06F 21/64
See application file for complete search history.

(56) References Cited

U.S. PATENT DOCUMENTS

| | | | |
|---|---|---|---|
| 4,996,711 A | 2/1991 | Chaum | |
| 6,446,207 B1 * | 9/2002 | Vanstone | H04L 9/3247 380/30 |
| 7,043,641 B1 | 5/2006 | Martinek et al. | |
| RE39,368 E | 10/2006 | Alcorn et al. | |
| 7,201,662 B2 | 4/2007 | LeMay et al. | |
| 7,707,420 B1 * | 4/2010 | Little | H04L 9/3247 380/30 |
| 7,720,221 B2 | 5/2010 | Brown et al. | |
| 7,844,051 B2 | 11/2010 | Brown et al. | |
| 2002/0023209 A1 * | 2/2002 | Domstedt | H04L 9/08 713/160 |

(Continued)

FOREIGN PATENT DOCUMENTS

CN   101741564   6/2010

OTHER PUBLICATIONS

International Search Report and Written Opinion of the International Searching Authority issued in International Application No. PCT/CA2011/050810 on Sep. 17, 2012; 9 pages.

(Continued)

*Primary Examiner* — Eleni Shiferaw
*Assistant Examiner* — Shaqueal Wade
(74) *Attorney, Agent, or Firm* — Fish & Richardson P.C.

(57) ABSTRACT

Methods, systems, and computer programs for generating a digital signature are disclosed. In some aspects, a symmetric key is accessed. The symmetric key is based on an ephemeral public key. The ephemeral public key is associated with an ephemeral private key. A ciphertext is generated based on the symmetric key and a message. An input value is obtained based on the ciphertext independent of a hash function. A digital signature is generated from the ephemeral private key, the input value, and a long term private key.

15 Claims, 4 Drawing Sheets

(56) References Cited

U.S. PATENT DOCUMENTS

| | | | |
|---|---|---|---|
| 2005/0175175 A1* | 8/2005 | Leech | H04L 9/0637 380/29 |
| 2007/0286575 A1* | 12/2007 | Oashi | G11B 20/00086 386/230 |
| 2008/0069347 A1 | 3/2008 | Brown et al. | |
| 2009/0046849 A1 | 2/2009 | Jablon et al. | |
| 2009/0100267 A1 | 4/2009 | Brown et al. | |
| 2010/0250945 A1* | 9/2010 | Brown | H04L 9/3231 713/172 |
| 2010/0308978 A1 | 12/2010 | Brown | |

OTHER PUBLICATIONS

A. Menezes, et al., Handbook of Applied Cryptography, Chapter 1—Overview of Cryptography, CRC Press, 1996.
A. Menezes, et al., Handbook of Applied Cryptography, Chapter 9—Hash Functions and Data Integrity, CRC Press, 1996.
A. Menezes, et al., Handbook of Applied Cryptography, Chapter 11—Digital Signatures, CRC Press, 1996.
A. Menezes, et al., Handbook of Applied Cryptography, Chapter 12—Key Establishment Protocols, CRC Press, 1996.
A. Menezes, et al., Handbook of Applied Cryptography, Chapter 13—Key Management Techniques, CRC Press, 1996.
D. Hankerson, A. Menezes, S. Vanstone , "Guide to Elliptic Curve Cryptography," Springer, New York, 2004, 332 pages.
"SEC 3: Elliptic Curve Signature Schemes with Partial Message Recovery: ECPVS and ECAOS," Working Draft, Certicom Research, Jun. 1, 2011, 38 pages.
International Preliminary Report on Patentability under Chapter I issued in International Application No. PCT/CA2011/050810 on Jul. 10, 2014; 8 pages.
Extended European Search Report in European Application No. 11878427.1, dated Jul. 31, 2015, 6 pages.
Office Action issued in Chinese Application No. 201180076454.1 on Sep. 27, 2016.

* cited by examiner

GENERATING DIGITAL SIGNATURES

CLAIM OF PRIORITY

This application is a U.S. National Stage of PCT/CA2011/050810 filed on Dec. 28, 2011, the entire contents of which is hereby incorporated by reference.

BACKGROUND

This specification relates to generating and verifying digital signatures in a cryptography system. Cryptography systems enable secure communication over public channels. For example, digital signature schemes can be implemented in a public key cryptography system. Many digital signature schemes utilize hash functions such as, for example, the conventional SHA family of hash functions.

BRIEF DESCRIPTION OF THE DRAWINGS

Like reference numbers and designations in the various drawings indicate like elements.

DETAILED DESCRIPTION

Techniques for generating and verifying digital signatures are presented in this disclosure. In some implementations, a digital signature scheme's efficiency or security, or both, can be improved when the signature scheme utilizes an input value that is obtained independent of a hash function. For example, in some instances, the input value can be obtained faster and using less processing resources than would be consumed by evaluating a more complex function, such as, for example, a hash function. Moreover, successful attacks against some types of hash functions have been realized, indicating possible security weaknesses.

Figure 1:
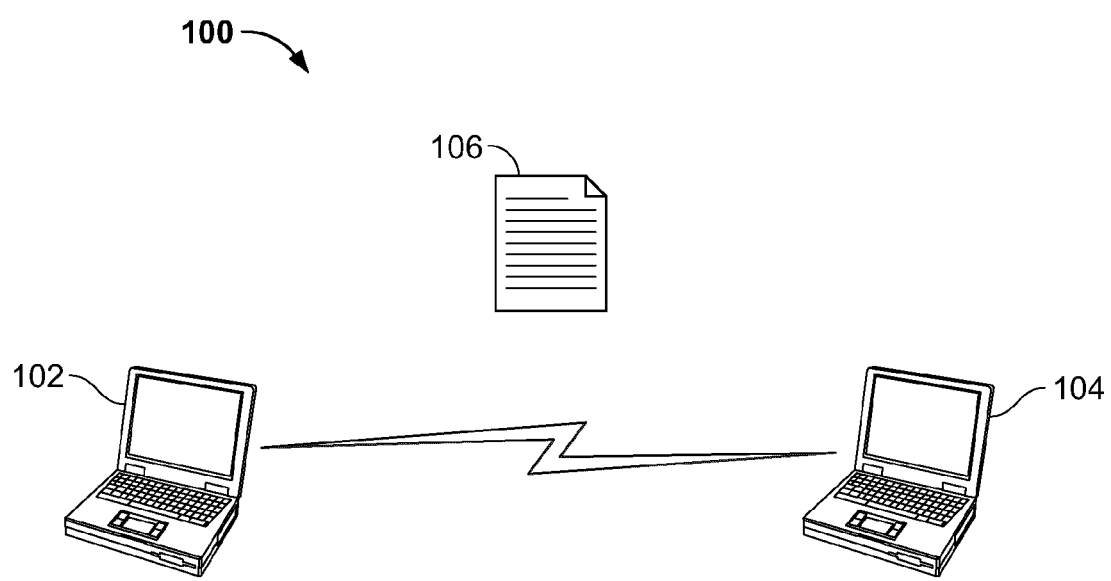
FIG. 1 is a schematic diagram of an example data communication system.

FIG. 1 is a schematic diagram of an example data communication system 100. The data communication system 100 includes a first terminal 102 and a second terminal 104. The data communication system 100 can include additional, fewer, or different components. For example, the data communication system 100 may include a data network, storage devices, servers (e.g., certificate authority servers, etc.), additional terminals, and other features not shown in the figure.

The terminals 102 and 104 can communicate with each other and with other components of the data communication system 100 over a data network or another type of communication link. In the example shown in FIG. 1, the terminal 102 sends the signed message 106 to the terminal 104. The data communication system 100 can support additional or different types of communication.

The terminals 102 and 104 can be implemented as computing devices, which may generally include a data processing apparatus, a data storage medium, and a data communication interface. For example, the terminals 102 and 104 shown in FIG. 1 can each include a processor, a memory, an input/output controller, and other components. The memory can include, for example, a random access memory (RAM), a storage device (e.g., a writable read-only memory (ROM), etc.), a hard disk, or another type of storage medium. A computing device can be preprogrammed or it can be programmed (and reprogrammed) by loading a program from another source (e.g., from a CD-ROM, from another computer device through a data network, or in another manner). The input/output controller can be coupled to input/output devices (e.g., a monitor, a keyboard, etc.) and to a data network. The input/output devices can receive and transmit data in analog or digital form over communication links such as a serial link, wireless link (e.g., infrared, radio frequency, etc.), parallel link, or another type of link.

The memory of a computing device can store instructions (e.g., computer code) associated with computer applications, programs and computer program modules, and other resources. For example, the memory can store instructions associated with computer program modules. The memory can also store application data and data objects that can be interpreted by applications, programs, modules, or virtual machines. The memory can store additional information, for example, files and instruction associated with an operating system, device drivers, archival data, or other types of information.

The processor of a computing device can execute instructions to generate output data based on data inputs. For example, the processor can run applications and programs by executing or interpreting the software, scripts, functions, executables, and other types of computer program modules. For example, the processor may perform one or more of the operations shown in FIGS. 2, 3 and 4. The input data received by the processor and the output data generated by the processor can be stored in a computer-readable medium, such as the memory or a storage device.

The data communication system 100 can include any suitable data communication network or other communication link. For example, the data network can include a wireless or wired network, a cellular network, a telecommunications network, an enterprise network, an application-specific public network, a Local Area Network (LAN), a Wide Area Network (WAN), a private network, a public network (such as the Internet), a WiFi network, a network that includes a satellite link, or another type of data communication network. The data network can include a tiered structure defined by firewalls or similar features that implement various levels of security. In some implementations, the terminals 102 and 104 communicate independent of a network. For example, the terminals 102 and 104 may communicate with each other directly over a short-range wireless communication link such as, for example, an optical link, an infrared link, a proximity-based radio frequency link, or another type of wireless or wired communication link.

The terminals 102 and 104 are generally operable to receive, transmit, process, and store information. The example terminals 102 and 104 shown in FIG. 1 may communicate with each other based on communication schemes specified by a cryptography system. Although FIG. 1 shows two terminals 102 and 104, a data communication system 100 may include any number of terminals. The data communication system 100 can include groups or subgroups of terminals that can communicate with each other, but not necessarily with the terminals in other groups or subgroups. The data communication system 100 can include terminals of disparate types, having different types of hardware and software configurations, and in a variety of different locations. In some cases, multiple devices or subsystems can be identified together as a single terminal.

A terminal can include user interface devices, for example, a monitor, touchscreen, mouse, or keyboard. Terminals can include handheld devices such as smart phones, personal digital assistants (PDAs), portable media players, laptops, notebooks, tablets, and others. Terminals can include work stations, mainframes, non-portable computing systems, devices installed in structures, vehicles, and other types of installations. Terminals can include embedded systems. For example, a terminal can be implemented as a computing device embedded in a casino gaming chip or another type of system or component. Other types of terminals may also be used.

The signed message 106 can include any type of electronic document, data file, data object, or other form of information. In some cases, the signed message 106 is an e-mail message, an electronic document, or an electronic data file that can be edited and rendered by appropriate software applications. In some cases, the signed message 106 is a data message or a combination of data messages used in signaling applications among hardware components. For example, the signed message may include an identifier or status information transmitted by a casino gaming chip. Other types of messages can be sent, as appropriate.

In one aspect of operation, the terminal 102 sends the signed message 106 to the terminal 104. The terminal 102 can form the signed message 106 by generating a digital signature. The digital signature can be combined with other data, as appropriate. For example, the digital signature can be combined with all or part of a plaintext message, a ciphertext message, addressing information, or other types of data to form the signed message 106. In some implementations, the digital signature and the underlying message are sent separately. The terminal 104 receives the signed message 106 and verifies the digital signature.

The digital signature for the signed message 106 can be generated based on elliptic curve cryptography or another type of cryptography scheme. In an elliptic curve cryptography (ECC) scheme, information is encoded in elliptic curve points of an elliptic curve group. An elliptic curve group can be described in terms of a solution to an equation over a finite field, for example, a prime finite field or a characteristic-two finite field. Each point in the elliptic curve group can be represented as a pair of field elements corresponding to a solution to an elliptic curve equation. The elliptic curve group also includes an identity element. As a particular example, let $F_p$ represent a prime finite field where p is an odd prime number, and let a, $b \in F_p$ satisfy $4 \cdot a^3 + 27 \cdot b^2 \neq 0 \pmod{p}$. The elliptic curve group $E(F_p)$ over $F_p$, which may be defined by the parameters a, $b \in F_p$ includes the set of points $M=(x, y)$ for x, $y \in F_p$ that represent a solution to the equation $y^2 \equiv x^3 + a \cdot x + b \pmod{p}$, together with a point O that is the identity element of the elliptic curve group $E(F_p)$.

In an ECC scheme, elliptic curve domain parameters over $F_p$ can be identified by a sextuple $T=(p, a, b, G, n, h)$. The integer p specifies the finite field $F_p$. Field elements a, $b \in F_p$ specify an elliptic curve $E(F_p)$ over $F_p$ as discussed above. The elliptic curve point $G=(x_G, y_G)$ on $E(F_p)$ is a base point generator. The integer n specifies the order of the base point generator G, having the property $nG=O$. The cofactor h is equal to $\#E(F_p)/n$, which is the number of points on the elliptic curve $E(F_p)$ divided by the order of the base point generator G. Elliptic curve domain parameters may alternatively be identified over other types of finite fields. For example, elliptic curve domain parameters over the characteristic two field $F_2^m$ can be identified by a septuple $T=(m, f(x), a, b, G, n, h)$, where m is an integer specifying the finite field $F_2^m$ and f(x) is an irreducible binary polynomial of degree m specifying the representation of $F_2^m$.

In an ECC scheme, an elliptic curve key pair (d, Q) can be generated based on valid elliptic curve domain parameters, for example, $T=(p, a, b, G, n, h)$ or $T=(m, f(x), a, b, G, n, h)$. The key pair may be generated by selecting a random integer d in the interval $[1, n-1]$, computing $Q=dG$, and outputting the key pair (d, Q). The random integer d may be selected or obtained by a random number generator.

In some implementations, a digital signatures in an ECC-based digital signature scheme can be generated and verified independent of a hash function, or using fewer hashing functions than conventional ECC-based digital signature techniques. Examples of conventional ECC-based digital signature schemes include the Elliptic Curve Digital Signature Algorithm (ECDSA), the Elliptic Curve Pintsov Vanstone Signature (ECPVS) scheme, and others. In some instances, the hash function can be replaced by an identity function, a truncation function, a reduction modulo the order of the generation point, a reduction modulo a smaller but more convenient value such as a power of two, or another type of function. The identity function or other function can be applied to the ciphertext, which may inherently contain sufficient entropy to make collisions improbable.

Figure 2:
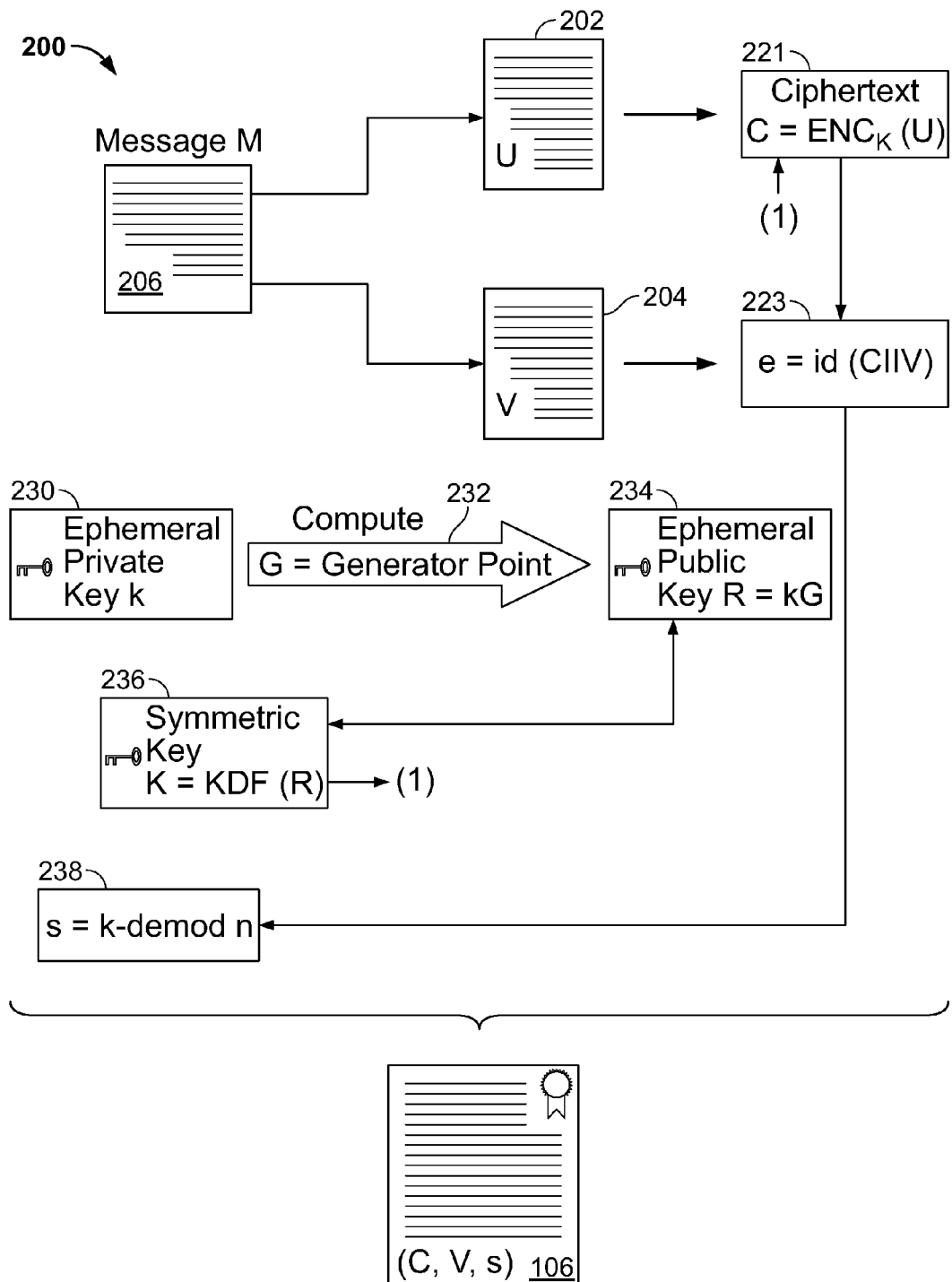
FIG. 2 is a schematic diagram of an example signing process.
Figure 3:
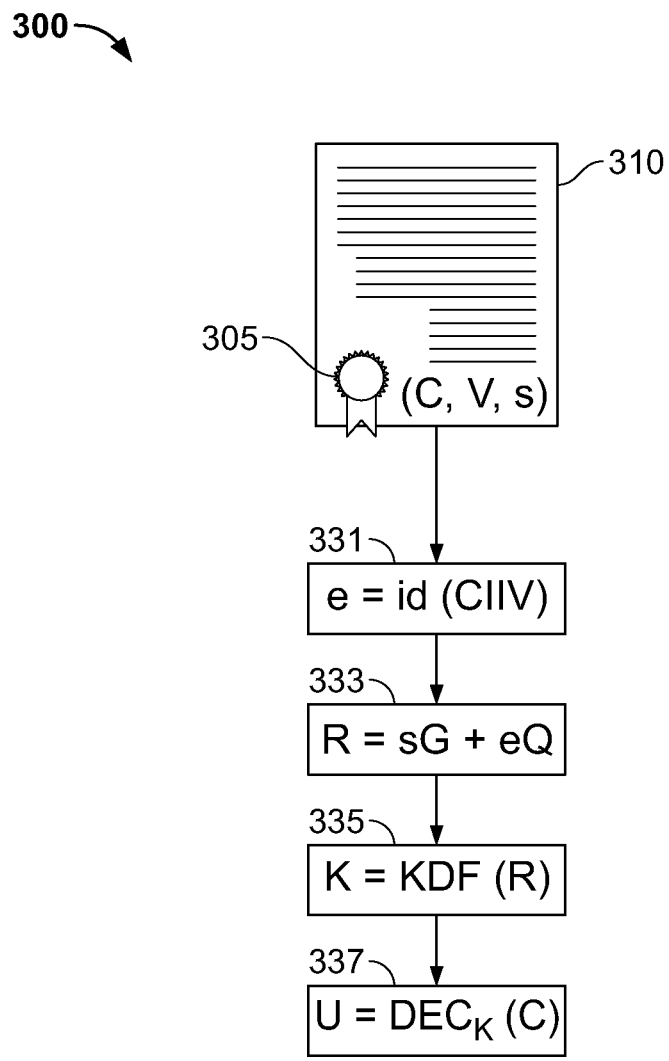
FIG. 3 is a schematic diagram of an example verification process.

FIG. 2 is a schematic diagram of an example signing process 200. The signing process 200 can be used, for example, by the terminal 102 to generate the signed message 106 shown in FIG. 1. The signing process 200 may receive as input an input message 206 to be signed. At 230, an ephemeral private key k is obtained. The ephemeral private key k can be an integer value retrieved from memory or a remote source, or generated locally, for example, by a pseudorandom generator or another type of hardware or software module. At 234, an ephemeral public key $R=kG$ can be obtained, where G is the generator point. A long term private key d (also known as a "static" public key) can be obtained and used to compute a long term (or "static") public key $Q=dG$. The long term private key d and the ephemeral private key k may be used by the signing entity at 238 to produce the digital signature value s. The long term public key Q and the ephemeral public key R can be used by a verifying entity to verify the digital signature (e.g., as shown in FIG. 3).

At 236, the ephemeral public key 234 can be used to generate a symmetric key K, for example, by evaluating a key derivation function (KDF). The key derivation function KDF can be used in both signing and verification operations. In some implementations, the key derivation function KDF is used to derive keying data $K=KDF(keydatalen, Z, OtherInput)$, where keydatalen is an integer that specifies the length of K to be generated, Z is a shared secret value, and OtherInput is some (optional) additional input. OtherInput may include some private information mutually-known to the parties involved in key derivation process. OtherInput may also include some other data such as the identifiers of the parties involved in key derivation.

The symmetric key can be calculated as $K=KDF(R)$, where $R=kG$. The key derivation function KDF can be, for example, an ANSI-X9.63-KDF, IKEv2-KDF, TLS-KDF, NIST-800-56-Concatenation-KDF, or another type of key derivation function. In some implementations, the key derivation function KDF can be another type of function, such as, for example, an identity function, a reduction function, or a truncation function. For example, when the symmetric encryption scheme is sufficiently strong (e.g., in the Advanced Encryption Standard-Cipher Block Chaining (AES-CBC) where a message longer than the key can be encrypted), an identity function, a reduction function, or a truncation function may be used to meet specified levels of security.

As shown in FIG. 2, the input message 206 can be divided into two message parts 202 and 204. The message part 204 (represented as V) can be made visible to third parties (i.e., can be observed without decryption) while the message part 202 (represented as U) is not. The message part 202 can be encrypted to form a ciphertext 221. For example, the ciphertext $C=ENC_K(U)$ can be generated using a symmetric encryption scheme ENC based on the symmetric key K calculated from K=KDF(R). The symmetric encryption scheme can be, for example, Triple DES in CBC mode, an XOR encryption scheme, an AES-CBC encryption scheme, or another type of encryption scheme. A symmetric encryption scheme may be chosen at a desired security level. For example, at the κ-bit security level, if the AES block cipher is chosen, then the octet length keydatalen of the keying data K may satisfy 8·keydatalen≥κ; if the XOR encryption scheme is chosen, then the keying data K may be chosen such that the bit length of K is equal to the bit length of the data input to the encryption function.

At 223, an input value e can then be generated based on the ciphertext C and the message 206. The example input value e shown in FIG. 2 is equal to the ciphertext C concatenated with V, as represented by the identify function e=id(C||V). The input value e may be obtained based on additional or different data inputs, as appropriate, independent of a hash function. As such, in this example, the value e can be computed from the ciphertext C concatenated with the message part V without invoking or otherwise utilizing a hash function. The input value e can then be used to generate the signature value s.

In some implementations, the input value e is obtained based on the ciphertext C using an identity function, a truncation function, a reduction function, or another type of function that does not use a hashing algorithm. In some instances, the input value e may include all or part of the ciphertext C, all or part of the message part V, or a combination of these, and possibly other information. When a truncation function is used, the truncation function may receive an initial value of C||V or another initial value and truncate the initial value to a specified length. For example, the truncation function may preserve a specified number the most significant bits, a specified number of least significant bits, or another subset of the initial value. Truncation may be performed by any suitable technique, including some conventional truncation techniques. When a reduction function is used, the reduction function may receive an initial value C||V or another initial value and reduce the initial value modulo a specified integer. For example, the integer can be n (the order of the generator point G) or a smaller integer (e.g. a power of 2). Reduction modulo an integer can be performed by any suitable technique, including some conventional reduction techniques. In some instances, when an identity function is used, the input value e is the value C||V (or another value) itself, and no additional computation is required (i.e., the identity function does not have to be evaluated) because the output of the identity function is equal to the input of the identity function.

In the example shown in FIG. 2, the signature values is generated based on the ephemeral private key k, the long term private key d, and the input value e, by evaluating s=k−de mod n, where n is the order of the generator point G. The signed message 106 may then include the digital signature. In the example shown in FIG. 2, the digital signature is represented as (C, V, s), a combination of the ciphertext C, the message part V, and the signature value s. The digital signature may have additional or different content, and it may have the format shown in FIG. 2 or a different format, as appropriate. The signed message 106 may be sent to a recipient device, which can verify the digital signature.

FIG. 3 is a schematic diagram of an example verification process 300. The verification process 300 can be used, for example, by the terminal 104 to verify the signed message 106 shown in FIG. 1. The example verification process 300 shows the operations that can be performed to verify a digital signature generated by the example scheme shown in FIG. 2. The process 300 may be modified for other digital signature schemes, as appropriate.

The verification process 300 shown in FIG. 3 receives as input the digital signature 305 of the signed message 310. At 331, an input value e is generated. As shown in FIG. 3, the input value e may be equal to the ciphertext C concatenated with the message part V included in the digital signature 305. The input value e may be obtained by reducing, truncating, or otherwise manipulating the ciphertext C concatenated with the message part V, independent of a hash function. As in the signature scheme in FIG. 2, in the example verification scheme in FIG. 3 the value e can be computed from the ciphertext C concatenated with the message part V without invoking or otherwise utilizing a hash function.

At 333, the ephemeral public key 333 can be calculated using R=sG+eQ. Here, s=k−de mod n is the signature part included in the digital signature 305, G is the generator point, and Q=dG is the long term public key. At 335, a symmetric key K can be computed, for example, using the key derivation function K=KDF(R). The calculation of the symmetric key K can correspond to the operation that was used to obtain the symmetric key at 236 in FIG. 2. At 337, the message part U can then be computed using $U=DEC_K(C)$, wherein DEC is the decryption operation in the symmetric encryption scheme used to generate the ciphertext C at 221 in FIG. 2. The message part U can be checked for redundancy to verify the validity of the digital signature. For example, a conventional redundancy check or any other appropriate redundancy check may be used.

Figure 4:
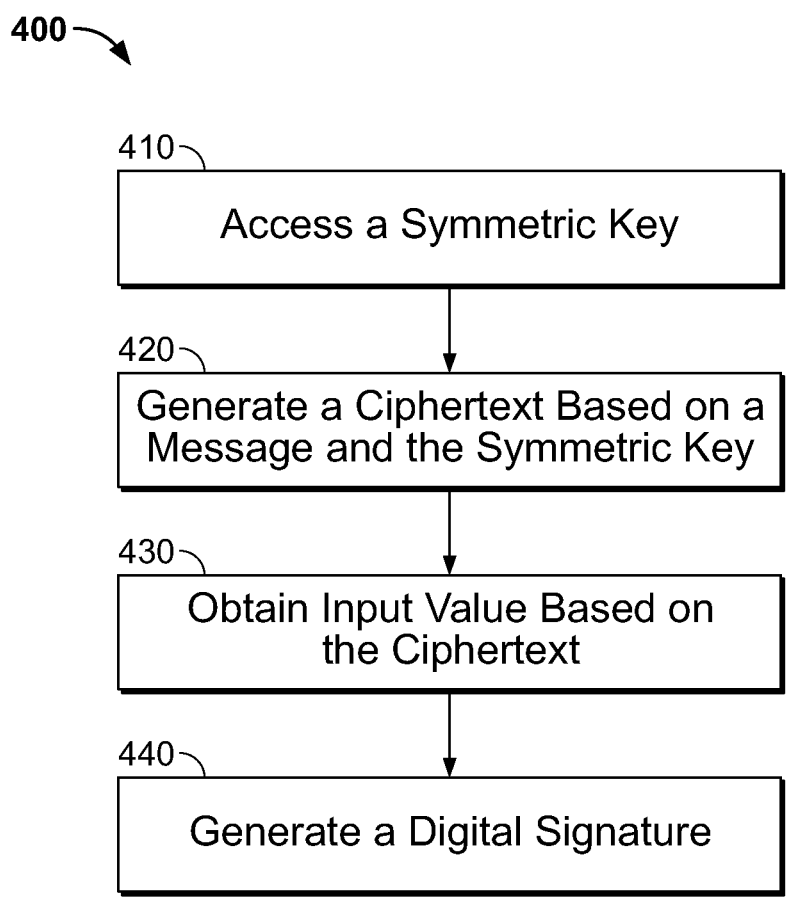
FIG. 4 is a flow chart showing an example process for generating a digital signature.

FIG. 4 is a flow chart showing an example process 400 for generating a digital signature. The process 400 can be implemented by any suitable hardware, for example, by a computing device or a system of computing devices. In some instances, the process 400 can be implemented by the terminal 102 shown in FIG. 1, or by another type of system or module. The example signing process 400 shown in FIG. 4 can be implemented using additional, fewer, or different operations, which can be performed in the order shown or in a different order. In some implementations, one or more of the operations can be repeated or iterated, for example, until a terminating condition is reached.

In some example implementations, all or part of the process 400 may be implemented in a constrained environment, for example, by a hardware security module embedded in a casino chip. In such environments, a hash function could be fairly expensive, in terms of logical gates. Therefore, implementing a digital signature scheme with a strong hash function, such as SHA-1, or a key derivation function KDF based on a strong hash function, such as SHA-1, could be expensive. Moreover, attacks on hash functions have revealed that some hash functions may not provide the desired level of security in all instances. As such, in certain contexts, utilizing an identity function, a reduction function, a truncation function or another type of low-computing-cost function could potentially provide equal or better security while allowing digital signatures to be generated and verified with less cost.

For purposes of illustration, the operations of the example signing process 400 are described below as implemented by a terminal of an elliptic curve cryptography system. For example, the signing process 400 may use certain operations that are used in the ECPVS digital signature scheme. The example process 400 can also be used in different types of cryptography systems.

At 410, a symmetric key is accessed. The symmetric key can be accessed from a local memory, from a remote device, or another source. The symmetric key is based on an ephemeral public key that is associated with an ephemeral private key. For example, the ephemeral private key can be obtained from a pseudorandom generator, and the ephemeral public key can be computed as the product of the ephemeral private key and a generator point. The symmetric key can then be computed by evaluating a key derivation function based on the ephemeral public key.

At 420, a ciphertext is generated based on the symmetric key and a message. The ciphertext can be generated based on the symmetric key and a first portion of the message. For example, the ciphertext can be computed as $C=ENC_K(U)$, where U is the first portion of the message, $K=KDF(R)$ is the key derivation function, $R=kG$ is the ephemeral public key, and k is the ephemeral private key. Any appropriate encryption function ENC or other technique may be used to produce the ciphertext, and the ciphertext may be generated based on additional or different input data.

At 430, an input value is generated independent of a hash function and based on the ciphertext. Generating the input value can include performing a reduction modulo an integer. The input value can be, or can be based on, a concatenation of the ciphertext and the second portion of the message. For example, the input value can be C∥V, where C is the ciphertext and V is the second portion of the message. As another example, the input value can be produced by truncating C∥V to a specified length, by reducing C∥V by a specified integer, or by anther technique. The input value e can be used to generate a component of the signature $s=k-de \mod n$, where n is the order of the generator point G, d is the long term private key of the entity generating the digital signature, and k is the ephemeral private key.

At 440, a digital signature is generated. The digital signature may be associated with the entity. For example, the entity can be a user, a computing device, a user account, or another type of entity. The digital signature include the ciphertext, the second portion of the message, and the signature component that was generated based on the input value. The digital signature can be transmitted from one computing device to another, such as from the terminal 102 to the terminal 104 as shown in FIG. 1. The digital signature may subsequently be verified at the receiving terminal.

Subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on non-transitory computer storage medium for execution by, or to control the operation of, data processing apparatus. Alternatively or in addition, the program instructions can be encoded for transmission to suitable receiver apparatus for execution by a data processing apparatus. A computer storage medium can be, or be included in, a computer-readable storage device, a computer-readable storage substrate, a random or serial access memory array or device, or a combination of one or more of them. The computer storage medium can be, or be included in, one or more separate physical components or media (e.g., multiple cards, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many implementation details, these should not be construed as limitations on the scope of what may be claimed, but rather as descriptions of features specific to some implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In a general aspect, a method for generating digital signatures is disclosed. The method for generating a digital signature may include accessing a symmetric key. The symmetric key is based on an ephemeral public key. The ephemeral public key is associated with an ephemeral private key. A ciphertext is generated based on the symmetric key and a message. An input value is generated based on the ciphertext independent of a hash function. A digital signature is generated based on the ephemeral private key, the input value, and a long term private key.

Implementations of these and other aspects can include one or more of the following features. The ciphertext is generated based on the symmetric key and a first portion of the message. Obtaining the input value includes producing a concatenation of the ciphertext and a second portion of the message. Obtaining the input value includes reducing the concatenation of the ciphertext and the second portion of the message modulo an integer n. The integer n represents an order of a generator point G, the ephemeral private key is an integer k, and the ephemeral public key is an elliptic curve point $R=kG$. Obtaining the input value includes truncating the concatenation of the ciphertext and the second portion of the message to a specified length. The digital signature value, the ciphertext, and the second portion of the message are transmitted from the computing device to another computing device.

Additionally or alternatively, implementations of these and other aspects can include one or more of the following features. The digital signature includes the ciphertext and the second portion of the message. Generating the digital signature includes $s=k-de \bmod n$, where s represents the digital signature, k represents the ephemeral private key, d represents the private key associated with the entity, e represents the input value, and n represents an integer. The ephemeral public key is a first elliptic curve point $R=kG$, and G is a generator point of order n. The symmetric key may be generated by evaluating a key derivation function based on the ephemeral public key.

Thus, implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method for generating a digital signature, the method comprising:

accessing a symmetric key, wherein the symmetric key is based on an ephemeral public key, and the ephemeral public key is associated with an ephemeral private key;

generating, by a hardware processor on a computing device, a ciphertext based on the symmetric key and a first portion of a message;

obtaining an input value independent of a hash function and based on the ciphertext, wherein obtaining the input value comprises:

producing a concatenation of the ciphertext and a second portion of the message; and applying at least one of a truncation function or a reduction function on the concatenation;

generating, by the hardware processor on the computing device, a digital signature value from the ephemeral private key, the input value, and a long term private key; and transmitting the digital signature value, the ciphertext, and the second portion of the message from the computing device to another computing device.

2. The method of claim 1, wherein obtaining the input value includes:

if the reduction function is applied on the concatenation, reducing the concatenation of the ciphertext and the second portion of the message modulo an integer n; or if the truncation function is applied on the concatenation, truncating the concatenation of the ciphertext and the second portion of the message to a specified length.

3. The method of claim 2, wherein the integer n represents an order of a generator point G, the ephemeral private key is an integer k, and the ephemeral public key is an elliptic curve point R=kG.

4. The method of claim 1, wherein generating the digital signature value includes computing s=k−de mod n, where s represents the digital signature value, k represents the ephemeral private key, d represents the long term private key associated with the entity, e represents the input value, and n represents an integer.

5. The method of claim 4, wherein the ephemeral public key is a first elliptic curve point R=kG, and G is a generator point of order n.

6. The method of claim 1, further comprising generating the symmetric key by evaluating a key derivation function based on the ephemeral public key.

7. A computing device comprising data processing apparatus operable to:

access a symmetric key, wherein the symmetric key is based on an ephemeral public key, and the ephemeral public key is associated with an ephemeral private key;

generate a ciphertext based on the symmetric key and a first portion of a message;

obtain an input value independent of a hash function and based on the ciphertext by:

producing a concatenation of the ciphertext and a second portion of the message; and applying at least one of a truncation function or a reduction function on the concatenation;

generate a digital signature value from the ephemeral private key, the input value, and a long term private key; and transmit the digital signature value, the ciphertext, and the second portion of the message from the computing device to another computing device.

8. The computing device of claim 7, wherein obtaining the input value includes:

if the reduction function is applied on the concatenation, reducing the concatenation of the ciphertext and the second portion of the message modulo an integer n; or if the truncation function is applied on the concatenation, truncating the concatenation of the ciphertext and the second portion of the message to a specified length.

9. The computing device of claim 8, wherein the integer n represents an order of a generator point G, the ephemeral private key is an integer k, and the ephemeral public key is an elliptic curve point R=kG.

10. A non-transitory computer-readable medium storing instructions that are operable when executed by data processing apparatus to perform operations for generating a digital signature, the operations comprising:

accessing a symmetric key, wherein the symmetric key is based on an ephemeral public key, and the ephemeral public key is associated with an ephemeral private key;

generating a ciphertext based on the symmetric key and a first portion of a message;

obtaining an input value independent of a hash function and based on the ciphertext, wherein obtaining the input value comprises:

producing a concatenation of the ciphertext and a second portion of the message; and applying at least one of a truncation function or a reduction function on the concatenation;

generating, at a computing device, a digital signature value from the ephemeral private key, the input value, and a long term private key; and transmitting the digital signature value, the ciphertext, and the second portion of the message from the computing device to another computing device.

11. The non-transitory computer-readable medium of claim 10, wherein obtaining the input value includes:

if the reduction function is applied on the concatenation, reducing the concatenation of the ciphertext and the second portion of the message modulo an integer n; or if the truncation function is applied on the concatenation, truncating the concatenation of the ciphertext and the second portion of the message to a specified length.

12. The non-transitory computer-readable medium of claim 11, wherein the integer n represents an order of a generator point G, the ephemeral private key is an integer k, and the ephemeral public key is an elliptic curve point R=kG.

13. The non-transitory computer-readable medium of claim 10, wherein generating the digital signature value includes computing s=k−de mod n, where s represents the digital signature value, k represents the ephemeral private key, d represents the long term private key associated with the entity, e represents the input value, and n represents an integer.

14. The non-transitory computer-readable medium of claim 13, wherein the ephemeral public key is a first elliptic curve point R=kG, and G is a generator point of order n.

15. The non-transitory computer-readable medium of claim 10, wherein the operations comprise generating the symmetric key by evaluating a key derivation function based on the ephemeral public key.

* * * * *